US011875647B2

(12) United States Patent
Amaitis et al.

(10) Patent No.: US 11,875,647 B2
(45) **Date of Patent: *Jan. 16, 2024**

(54) BETS REGARDING INTERMEDIATE POINTS IN A RACE EVENT USING FRACTIONAL TIMING

(71) Applicant: CFPH, LLC, New York, NY (US)

(72) Inventors: Lee M. Amaitis, Las Vegas, NV (US); Joseph M. Asher, Las Vegas, NV (US); Kenneth L Miller, Ankeny, IA (US); Peter C. Rotondo, New York, NY (US)

(73) Assignee: CFPH, LLC, New York, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/536,207

(22) Filed: Nov. 29, 2021

(65) Prior Publication Data

US 2022/0084369 A1 Mar. 17, 2022

Related U.S. Application Data

(63) Continuation of application No. 16/689,995, filed on Nov. 20, 2019, now Pat. No. 11,189,135, which is a continuation of application No. 13/617,299, filed on Sep. 14, 2012, now Pat. No. 10,515,515, which is a continuation of application No. 11/201,830, filed on Aug. 10, 2005, now Pat. No. 8,491,366, which is a continuation-in-part of application No. 10/879,972, filed on Jun. 28, 2004, now Pat. No. 8,500,529.

(60) Provisional application No. 60/682,521, filed on May 18, 2005.

(51) Int. Cl.
*G07F 17/32* (2006.01)

(52) U.S. Cl.
CPC .......... *G07F 17/3288* (2013.01); *G07F 17/32* (2013.01)

(58) Field of Classification Search
CPC ............. G07F 17/3288; G07F 17/3211; G07F 17/3225; G07F 17/323; G07F 17/326; A63F 3/00082; A63F 9/00; A63K 1/00
See application file for complete search history.

(56) References Cited

U.S. PATENT DOCUMENTS

| | | | | |
|---|---|---|---|---|
| 5,842,921 A * | 12/1998 | Mindes | .................. | G06Q 50/34 463/16 |
| 2008/0139316 A1* | 6/2008 | He | ......................... | G06Q 10/00 463/42 |

* cited by examiner

*Primary Examiner* — Omkar A Deodhar

(57) ABSTRACT

A system for betting on fractional times comprises a memory coupled to a processor. The memory stores a first betting option comprising a bet that a particular participant in a race will finish a predetermined length of the race in a first range of fractional times. The memory further stores a second betting option comprising a bet that the particular participant in the race will finish the predetermined length of the race in a second range of fractional times. The processor receives a plurality of bets on at least one of the first betting option and the second betting option and determines an actual time for the particular participant to finish the predetermined length of the race. The processor then determines which of the plurality of bets are winning bets based at least in part upon the determination of the actual time and the corresponding betting options.

10 Claims, 5 Drawing Sheets

162 200

| SELECTED HORSES | INTERMEDIATE POINT/FINISH LINE | | | | | | | |
|---|---|---|---|---|---|---|---|---|
| | 104a | 104b | 104c | 104d | 104e | 104f | 104g | 108 |
| HORSE # 1 | 2 | 2 | 4 | 3 | 4 | 3 | 3 | 1 |
| HORSE # 4 | 7 | 6 | 9 | 10 | 7 | 5 | 4 | 5 |
| HORSE # 6 | 12 | 10 | 7 | 8 | 8 | 7 | 9 | 11 |
| | 1 | 2 | 3 | 4 | 5 | 6 | 7 | 8 |

202 202

BETS REGARDING INTERMEDIATE POINTS IN A RACE EVENT USING FRACTIONAL TIMING

CROSS REFERENCE TO RELATED APPLICATIONS

This application is a continuation of U.S. patent application Ser. No. 16/689,995 filed Nov. 20, 2019, which is a continuation of U.S. patent application Ser. No. 13/617,299 filed on Sep. 14, 2012 (now U.S. Pat. No. 10,515,515), which is a continuation of U.S. patent application Ser. No. 11/201,830 filed on Aug. 10, 2005 (now U.S. Pat. No. 8,491,366 issued on Jul. 23, 2013) which is a continuation-in-part of U.S. patent application Ser. No. 10/879,972 filed on Jun. 28, 2004 (now U.S. Pat. No. 8,500,529 issued on Aug. 6, 2013). This application further claims priority to U.S. Provisional Application No. 60/682,521 filed on May 18, 2005.

TECHNICAL FIELD OF THE INVENTION

This invention relates in general to betting on events and, more particularly, to a system and method for providing bets regarding intermediate points in a race event using fractional timing.

BACKGROUND OF THE INVENTION

Wagering on sporting events, such as horse races, for example, is a large and growing industry in many parts of the world. Various types of betting products or systems are available for various types of sporting events. For example, typical horse racing bets allow bettors to bet on the finishing position of a single horse or several horses in a particular race or series of races. For instance, a bettor can bet on a particular horse to finish first (win), finish in the top two (place), or finish in the top three (show). A bettor may also make various combination bets with multiple horses, such as an exacta bet (covering the top two finishing horses in order) or a trifecta bet (covering the top three finishing horses in order). In addition, a bettor may bet on a series of races, such as the daily double (winners of two consecutive races), the pick-three (winners of three consecutive races), and the pick-six (winners of six consecutive races), for example.

In a pari-mutuel betting system, all bets regarding a particular event are aggregated, a commission (or "take-out") is taken by the track, and the remainder is distributed among the winning bettors. For example, pari-mutuel betting systems are commonly used in North America (and other various places throughout the world) for betting on horse races.

SUMMARY OF THE INVENTION

According to one embodiment, a method of providing and managing bets is provided. One or more particular race participants in a race event are determined. For each intermediate point within a race event, one or more particular possible positions of race participants at that intermediate point is determined. A bet comprising a plurality of bet components is generated, one or more of the bet components being defined by the particular race participants and the particular possible positions of race participants determined for at least one of the intermediate points. Intermediate race results are received for each intermediate point identifying the actual positions of the particular race participants at that intermediate point. A result of at least one bet component is determined based on the particular race participants, the particular possible positions of race participants determined for at least one intermediate point, and the received intermediate race results for at least one intermediate point.

According to another embodiment, another method of providing and managing bets is provided. A bet identifying one or more particular race participants in a race event is received. The bet regards the positions of the one or more particular race participants at one or more intermediate points within the race event. Intermediate race results identifying the positions of each of the one or more particular race participants at the one or more intermediate points are received, and a result of the bet is determined based at least in part on the received intermediate race results.

According to yet another embodiment, another method of providing and managing bets is provided. A determination of one or more particular race participants in a race event having a plurality of race participants is received. A bet matrix is generated, which includes a plurality of columns extending in a first direction and a plurality of rows extending in a second direction, each column corresponding with one of a plurality of intermediate points in a race event. For each of a plurality of intermediate points within the race event, one or more particular possible positions of race participants at that intermediate point are determined. Each column in the bet matrix is populated with entries identifying the one or more possible positions determined for the intermediate point corresponding with that column. A bet associated with the bet matrix is provided and includes one or more bet components. At least one of the bet components is defined at least in part by (a) at least one of the one or more particular race participants and (b) the arrangement of the numbers within one or more columns of the bet matrix.

Intermediate race results for each of the plurality of intermediate points are received which identify the race participants that were actually positioned in each of the one or more possible positions determined for that intermediate point. Matched entries (if any) are identified within the bet matrix based on the received intermediate race results. A matched entry is a matrix entry that identifies a possible position in which one of the particular race participants was actually positioned at the intermediate point corresponding with the column in which that matrix entry is located. The result for each bet component is determined based at least in part on the relative locations of each of the determined matched entries within the bet matrix. For example, particular bet components may require a particular number of matched entries aligned consecutively in a single direction (such as horizontally, vertically, or diagonally) within the bet matrix.

In still other embodiments, a system for betting on fractional times comprises a memory coupled to a processor. The memory stores a first betting option comprising a bet that a particular participant in a race will finish a predetermined length of the race in a first range of fractional times. The memory further stores a second betting option comprising a bet that the particular participant in the race will finish the predetermined length of the race in a second range of fractional times. The processor receives a plurality of bets on at least one of the first betting option and the second betting option and determines an actual time for the particular participant to finish the predetermined length of the race. The processor then determines which of the plurality of bets are winning bets based at least in part upon the determination of the actual time and the corresponding betting options.

In yet another embodiment, a method for betting on fractional times comprises receiving a determination of a particular race participant in a race event having a plurality of race participants. For at least one of a plurality of intermediate points within the race event, a range of fractional times is determined for the race participant at that intermediate point. The method continues by generating a bet comprising a plurality of bet components. At least one of the bet components is defined at least in part by the determined race participant and the range of fractional times for the race participant at the intermediate point. For the intermediate point within the race event, intermediate race results are received identifying the actual time of the race participant. For at least one bet component, a result for that bet component is determined based at least in part on the race participant, the range of fractional times at the intermediate point, and the received intermediate race results for the intermediate point.

Various embodiments of the present invention may benefit from numerous advantages. It should be noted that one or more embodiments may benefit from some, none, or all of the advantages discussed below.

One advantage of the invention is that bets may be offered regarding the positions and/or fractional times of particular race participants (such as horse or dogs, for example) at one or more intermediate points in a race event (such as a horse race or dog race, for example). Thus, more betting events and types of bets are available to customers for each race event. In addition, some bettors may place interval bets on race events when they would not have otherwise placed traditional bets on the event. This may increase the total pool of wagers on the race event, which may increase the purses offered for race events and/or the profits of the entities that collect a commission or take-out from such wagers. Another advantage of the invention is that such interval bets may be provided in a pari-mutuel betting system in which all bets regarding a particular event are pooled.

Another advantage of the invention is that timing and/or recording devices may be located at intermediate points along a race track in order to determine the positions and/or fractional times of race participants at such intermediate points. As discussed above, this positional and/or fractional timing information may then be used as input for determining the results of various bet components of interval bets. In addition, a computerized system may generate a bet matrix for an interval bet, which may be printed on a bet ticket and provided to the customer placing the interval bet. By using such a computerized system, bet matrices may be generated nearly instantaneously, including populating at least a portion of such bet matrices with randomly generated entries. Moreover, the computational power of a computerized system can be used to generate and process sophisticated, multi-dimensional bet matrices that may be difficult to perform otherwise. Each bet matrix may at least partially define various bet components of an interval bet such that the customer may track the progress and/or results of the various bet components.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
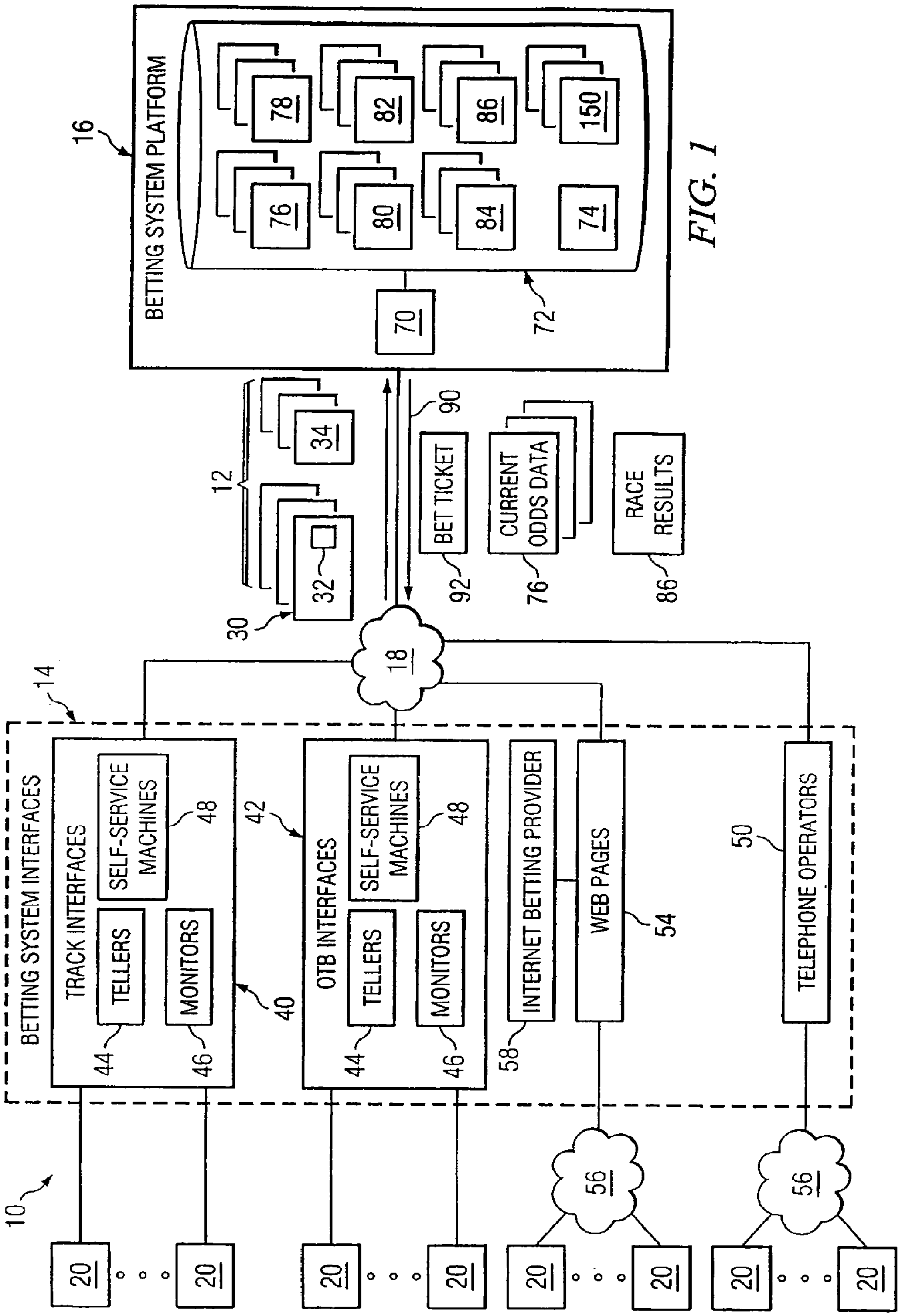
FIG. 1 illustrates an example system for providing and managing interval bets regarding intermediate points in a race event in accordance with an embodiment of the present invention.

FIG. 1 illustrates an example system 10 for providing and managing interval bets regarding intermediate points in a race event in accordance with an embodiment of the present invention. System 10 includes one or more betting system interfaces 14 and a betting system platform 16 coupled by one or more communications networks 18. In general, one or more customers 20 may receive betting information (such as event times, betting rules, betting options and odds, for example) and/or place bets 12 via betting system interfaces 14. In some embodiments, bets 12 are received by betting system interfaces 14 and communicated to betting system platform 16. Betting system platform 16 may then store the received bets 12, determine appropriate odds, bet results and payouts, and communicates such odds, bet results and payouts to one or more of the betting system interfaces 14.

System 10 permits customers 20 to place interval bets 30 on a race event having a group of race participants, such as a horse race, dog race, or auto race, for example. In some embodiments, each interval bet 30 may include one or more bet components 32, each comprising a bet regarding the positions and/or fractional times of one or more particular race participants at one or more intermediate points in the race event and/or at the finish of the race event. Thus, a particular interval bet 30 may in fact comprise a number of different bets regarding the positions of participants. For instance, in a one-mile horse race, an example interval bet 30 may include a first bet component **32*a* regarding whether Horse #3 will be in 5th place at the ¼ mile point of the race; a second bet component 32*b* regarding whether Horse #3 will be in 2nd place at the ½ mile point of the race; a third bet component 32*c* regarding whether Horse #3 will be in 7th place at the ¾ mile point of the race; and a fourth bet component 32*d*** regarding whether Horse #3 will be in 1st place at the finish line (i.e., the 1 mile point) of the race.

Another interval bet 30 may comprise a number of different bets regarding the fractional timing of participants at various intervals in the race. In this respect, the type of wagering offered herein is a departure from traditional forms of wagering on races which includes wagering on the finishing positions of the participants in the race. The wagering on fractional timing can be pari-mutuel, exchange-based or available for fixed odds betting. It would not necessarily replace traditional betting on the finishing positions of participants but, rather, would provide a viable alternative option to bettors. Interval bets 30 and bet components 32 of interval bets 30 are described below in greater detail.

In some embodiments, system 10 may also permit customers 20 to place traditional bets 34 in addition to interval bets 30. Traditional bets 34 may include bets such as win bets, place bets, show bets, exacta bets, trifecta bets, wheel bets, box bets, daily double bets, and pick-six bets, among others, for example. In some embodiments, a customer 20 may place one or more traditional bets 34 and one or more interval bets 30 on the same race event or group of race events.

Odds and/or payouts for bets 12 provided by system 10 (including interval bets 30 and/or traditional bets 34) may be determined in any suitable manner. For example, odds and/or payouts for some bets 12 provided by system 10 may be determined according to a pari-mutuel system in which the wager amounts for a group of bets 12 (such as a particular type of bet 12 or bets 12 regarding a particular race event, for example) are pooled, a commission (or "take-out") is taken by the track or other wagering provider, and the remainder is distributed among the winning bettors. Alternatively, odds and/or payouts for some bets 12 provided by system 10 may be determined according to some other system, such as a betting system in which customers 20 take positions against a bookmaker, for example. For some bets 12, predetermined or fixed odds may be determined and communicated to customers 20.

In particular, bet components 32 for interval bets 30 may be determined in a pari-mutuel manner, using predetermined or fixed odds, or in any other suitable manner. Certain interval bets 30 may include one or more pari-mutuel bet components 32 (bet components 32 whose odds and/or payouts are determined in a pari-mutuel manner) and one or more bet components 32 whose odds and/or payouts are otherwise determined (such as based on fixed odds). In some embodiments, a separate pari-mutuel pool is provided for each type of pari-mutuel bet component 32 included in an interval bet 30. The wager amounts for each type of pari-mutuel bet component 32 included in an interval bet 30 placed by one customer 20 may then be pooled with the wager amounts for the same type of bet component 32 of interval bets 30 placed by other customers 20. In addition, a different set of pari-mutuel pools may be provided for each race event. In some embodiments, when there are no winning bet components 32 in a particular pari-mutuel pool, the wager amounts in that pool may be returned to the customers 20, carried over to a new pari-mutuel pool for a subsequent race, or otherwise managed.

Betting system interfaces 14 may include any suitable interface between a customer 20 and betting system platform 16. For example, as shown in FIG. 1, betting system interfaces 14 may include physical interfaces, such as track interfaces 40 and/or off-track interfaces 42. Track interfaces 40 are generally located at a track, while off-track interfaces 42 are generally located at an off-track-betting (OTB) establishment, such as an OTB parlor. Track interfaces 40 and off-track interfaces 42 may include tellers 44, which may receive bets 12 from and distribute payouts to customers 20, and/or monitors 46, which may be viewed by customers 20 to monitor betting information such as the event time, the current odds, and the projected or actual payouts for various bets 12, for example. In some situations, such information may be updated substantially in real time or at preset intervals (such as every 30 seconds or after each intermediate point in the race event, for example) as new bets 12 are placed and/or as information regarding the event changes, for example. Monitors 46 may include, for example, toteboards or closed-circuit televisions located at a track or OTB establishment.

Track interfaces 40 and/or off-track interfaces 42 may also include one or more self-service betting machines 48. In some embodiments, self-service betting machines 48 allow customers 20 to insert payment into the machine (such as cash or by using a voucher or a credit or debit card), place one or more interval bets 30 and/or traditional bets 34, and receive a printout (such as a ticket, for example) indicating the bet or bets placed. Printouts for winning bets may be inserted into the self-service betting machine, such as to receive a payment voucher (which may be used to receive a payout from a teller 44) or to place additional bets 12. In other embodiments, self-service betting machines 48 allow customers 20 to use a credit or debit card to place bets 12. The credit or debit card may have an associated account, which may be a betting account provided and/or managed by a betting account provider. In some embodiments, after the race event is completed, a customer 20 may insert or swipe his or her credit or debit card in the self-service betting machines 48 in order to update the balance on the card. Self-service betting machines 48 may also allow the customer 20 to print out payment vouchers which may be presented to a teller 44 in order to receive payments.

As shown in FIG. 1, betting system interfaces 14 may also include various non-physical interfaces, such as one or more telephone operators 50 and one or more web pages 54. Customers 20 may access or communicate with such non-physical interfaces via one or more communications networks 56. Communications networks 56 may include one or more servers, routers, switches, repeaters, backbones, links and/or any other appropriate type of communication devices coupled by links such as wire line, optical, wireless, or other appropriate links. In general, communication network 56 may include any interconnection found on any communication network, such as a telephone network, a local area network (LAN), metropolitan area network (MAN), wide area network (WAN), the Internet, portions of the Internet, or any other data exchange system. To access betting system interface 14 using communication networks 56, customers 20 may use a computer, a personal digital assistant (PDA), a cell-phone, a remote paging device, an electronic mail communication device, a handheld betting device, or any other suitable mobile device. In certain embodiments, customers 20 may receive any suitable information, such as betting information, from betting system platform 16 via mobile devices using, for example, communication networks 56 and betting system interfaces 14.

Telephone operators 50 may communicate betting information (such as event times, betting rules, betting options and odds, for example) to, and take bets 12 from, customers 20. Similarly, web pages 54 may communicate betting information to customers 20 and allow customers 20 to place bets 12. One or more of such web pages 54 may be hosted by one or more servers associated with system 10, which server or servers may also host betting system platform 16 in some embodiments. In some embodiments, betting information available to customers 20 via web pages 54 may be updated substantially in real time or at preset intervals (such as every 30 seconds, for example) as new bets 12 are placed and/or as information regarding the event changes, for example.

In some embodiments, one or more web pages 54 may be provided by, or associated with, an Internet betting provider 58, for example. Internet betting provider 58 may provide Internet account wagering by providing online betting accounts to one or more customers 20. Using an online betting account, a customer 20 may interface with one or more web pages 54 associated with the Internet betting provider 58 in order to fund the account, view betting information regarding race events, and place bets 12 (such as interval bets 30 and/or traditional bets 34). Such online betting accounts may include one or more various types of accounts, such as deposit accounts, credit accounts, stop-loss accounts, and hybrid accounts, for example.

Some or all of the betting system interfaces 14 of system 10 may be operable to offer or receive both interval bets 30 and traditional bets 34. However, in some embodiments, one or more betting system interfaces 14 may only offer or receive either interval bets 30 or traditional bets 34. For example, in a particular embodiment, a set of web pages associated with betting system platform 16 may allow customers 20 to place both interval bets 30 and traditional bets 34, while a particular self-service betting machine 48 may only allow customers 20 to place interval bets 30, or vice versa.

As discussed above, betting system platform 16 is operable to receive bets 12 (including both interval bets 30 and traditional bets 34) from betting system interfaces 14, store the received bets 12, determine appropriate odds, bet results and payouts, and communicate such odds, bet results and/or payouts to one or more of the betting system interfaces 14, which may then display such odds, bet results and/or payouts to customers 20. As shown in FIG. 1, betting system platform 16 includes a processor 70 coupled to a memory 72. Processor 70 is generally operable to execute a betting system software application 74 or other computer instructions to determine current odds data 76, bet results 78, and payouts 80, which are discussed below in greater detail.

As discussed above, betting system platform 16 comprises processor 70 and memory 72. Processor 70 may comprise any suitable processor that executes betting system software application 74 or other computer instructions, such as a central processing unit (CPU) or other microprocessor and may include any suitable number of processors working together. Memory 72 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory devices.

Memory 72 is generally operable to store various information that may be used by processor 70 in determining odds, bet results and/or payouts. For example, memory 72 may comprise any suitable number of databases, which may be co-located or physically and/or geographically distributed. In the example shown in FIG. 1, memory 72 may store any or all of the following: betting system software application 74, current odds data 76, bet results 78, payouts 80, race event parameters 82, bet parameters 84, race results 86, and bet matrices 150.

Current odds data 76 may include current or near-current data regarding, for example, (a) the wager amounts stored in pari-mutuel pools for various bets 12 (including interval bets 30, bet components 32 and/or traditional bets 34), (b) current odds data for various bets 12 (whether such bets 12 are pari-mutuel or fixed odds bets), and/or (c) potential payout data for various bets 12, such that customers 20 may determine the potential payouts for bets 12 based on the wager amounts of such bets 12. As discussed above, processor 70 is operable to execute betting system software application 74 to determine such current odds data 76. Processor 70 may determine such current odds data 76 based at least on data received from memory 72 and/or one or more betting system interfaces 14. In addition, processor 70 may update such current odds data 76 based on new information being received by betting system platform 16. In some embodiments, processor 70 may update current odds data 76 in real time, substantially in real time, or at preset intervals (such as every 30 seconds, for example).

As shown in FIG. 1, current odds data 76 may be communicated to one or more betting system interfaces 14 via communications network 18, as indicated by arrow 90. Current odds data 76 may then be made available to customers 20, such as via tote boards or monitors 46 located at a track or OTB establishment, for example, or in appropriate web page(s) 54 that may be accessed by customers 20, for example. In this manner, customers 20 may have access to real-time or substantially real-time current odds data 76 regarding various bets 12 or race events.

Bet results 78 may comprise various data regarding the results of various bets 12 (including interval bets 30, bet components 32 and/or traditional bets 34), such as the identity of the customer 20 who placed the bet 12, the result of the bet, the determined payout 80 for the bet 12 and/or whether the payout 80 was distributed to the customer 20, for example. Possible results for a bet 12 may include, for example, "win," "lose," "push," or "no action." Processor 70 may determine such results for a bet 12 based on race event parameters 82 regarding one or more relevant race events, bet parameters 84 regarding the bet 12, race results 86 regarding one or more relevant race events (which may include the positions of various race participants at each intermediate point 104 and at the finish line 108 of the race as illustrated, for example, in FIG. 2), and bet matrices 150 generated by betting system platform 16.

Processor 70 may determine payouts 80 for each winning bets 12 based on various data depending on whether the bet 12 is a pari-mutuel, fixed-odds, or other type of bet. Processor 70 may determine payouts 80 for winning pari-mutuel and fixed-odds bets 12 according to known methods for determining payouts for such types of bets. It should be understood that the payouts 80 determined by betting system platform 16 may comprises potential payouts and profits, which may be calculated and/or updated dynamically prior to the race, or actual payouts and profits, which may be calculated after betting on the race has been closed, or after the race has been run and/or declared "official."

Race event parameters 82 may comprise various parameters of one or more race events, such as, for example, the type of race event, the time, date and location of the race event and/or the number (or in some cases, the name) of each of the participants in the race event.

Bet parameters 84 may comprise various parameters of one or more received bets 12 (including interval bets 30, bet components 32 and/or traditional bets 34), such as the identity of the customer 20 who placed the bet 12, the manner in which the bet 12 was placed (such as via telephone, the Internet, or in person at a track or OTB establishment, for example), the type of bet 12 (such as whether the bet 12 is an interval bet 30 or a traditional bet 34, for example), the commission rate on the bet 12, the particular participants and/or fractional times determined (for example, selected by the customer 20 or determined by betting system platform 16 randomly, based on previous race results, or based on the participants determined for other customer's bets 12 and/or the wager amounts of such other bets, or otherwise determined) for an interval bet 30, and/or the wager amount of the bet 12.

Race results 86 may comprise various data regarding the results of one or more race events, such as the position and/or fractional times of each participant at various intermediate points and at the finish line of a race, whether there was a tie for any position and/or whether any participants did not finish the event, for example. Race results 86 may be received from various intermediate point recording devices and finish line recording devices located around a racetrack, as discussed in greater detail below with reference to FIG. 2.

Bet matrices 150 may define various bet components 32 of an interval bet 30. Bet matrices 150 may by generated by betting system platform 16 based on various inputs, such as race event parameters 82 regarding one or more race events and particular bet parameters 84 (which may be selected by a customer 20 or determined by betting system platform 16), for example. In some embodiments, betting system platform 16 may populate (or fill in) at least a portion of a bet matrix 150 with randomly determined numbers representing possible positions and/or fractional times of race participants at various intermediate points and/or at the finish line of a race event. In some embodiments, bet matrices 150 are physically printed on bet tickets 92 and given to customers 20 who place interval bets 30 such that a customer 20 may follow the progress of his interval bet 30 and determine the results of the bet components 32 of the interval bet 30. In other embodiments, bet matrices 150 are not physically printed on bet tickets 92. In either embodiment, bet matrices 150 are stored and utilized by betting system platform 16 to define and manage bet components 32. In some embodiments, by using a computerized betting system platform 16, bet matrices 150 may be generated and/or recorded nearly instantaneously, including populating at least a portion of such bet matrices 150 with randomly generated entries.

It should be understood that references herein to making "random" determinations (such as randomly determining numbers for a bet matrix, randomly determining possible positions and/or fractional times of race participants, or randomly determining particular race participants for an interval bet 30, for example) includes using a computer (such as a computer associated with betting system platform 16, for instance) to determine "random" or "pseudo-random" numbers using any known or otherwise suitable algorithms or techniques.

As discussed above, one or more communications networks 18 couple and facilitate wireless or wireline communication between one or more betting system interfaces 14 and betting system platform 16. Each communication network 18 may include one or more servers, routers, switches, repeaters, backbones, links and/or any other appropriate type of communication devices coupled by links such as wire line, optical, wireless, or other appropriate links. In general, each communication network 18 may include any interconnection found on any communication network, such as a local area network (LAN), metropolitan area network (MAN), wide area network (WAN), the Internet, portions of the Internet, or any other data exchange system.

It should also be understood that one, some or all of the components of betting system platform 16 may be located together or may be physically or geographically distributed. In addition, one, some or all of the components of betting system platform 16, as well as any wager pools (such as pari-mutuel pools, for example) associated with interval bets 30, may be located at a track at which race events associated with such interval bets 30 are hosted or at any other suitable location, such as at another track or OTB entity, for example. In some embodiments, for example, pari-mutuel pools for particular interval bets 30 (or bet components 32) are hosted by the track at which the race events covered by such bets are occurring. In other embodiments, pari-mutuel pools for particular interval bets 30 (or bet components 32) are hosted by a track or OTB entity separate from the track at which the race events covered by such bets are occurring.

Example Track Configuration

Figures 2, 4:
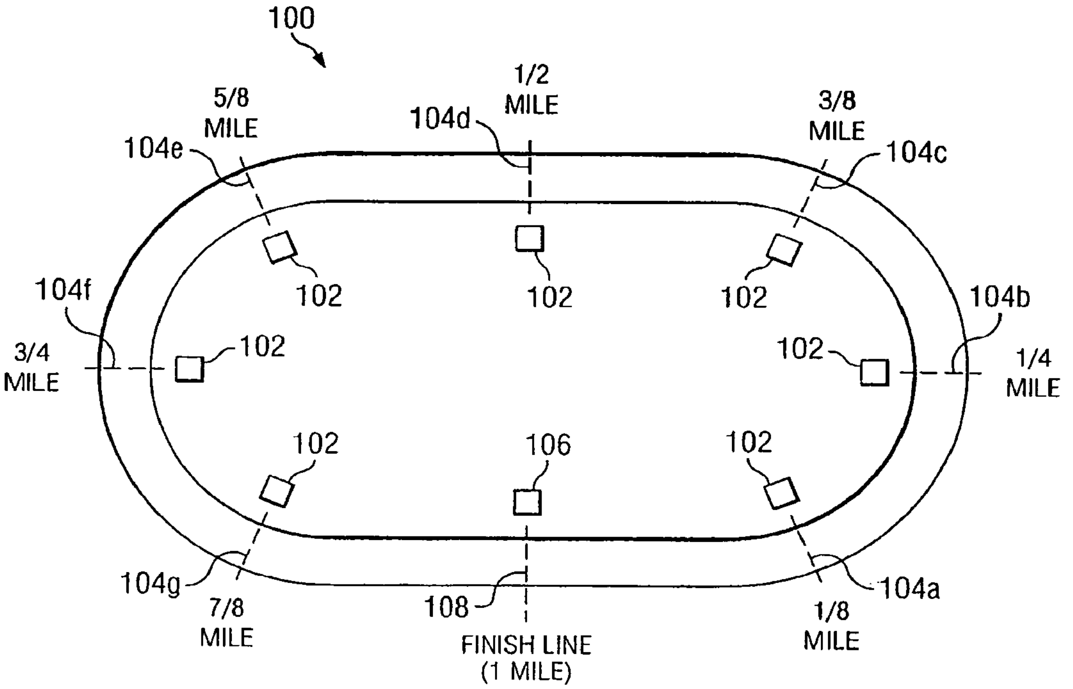
FIG. 2 illustrates an overview of an example race track used in the system of FIG. 1.
FIG. 4 illustrates an example table indicating the actual positions of particular participants at each intermediate point and at the finish line of a race event.

FIG. 2 illustrates an overview of a race track 100 for an example race event. Race track 100 may be any suitable length and shape, such as a one-mile oval track, for example. Intermediate point recording devices 102 may be located at each of one or more intermediate points 104 along race track 100, and finish line recording devices 106 may be located at the finish line 108 of race track 100. Intermediate point recording devices 102 and finish line recording devices 106 may comprise any devices suitable for recording the actual positions and/or fractional times of race participants as such race participants cross intermediate points 104 and finish line 108. For example, intermediate point recording devices 102 and/or finish line recording devices 106 may include a teletimer, a camera and/or other suitable timing and recording devices. In some embodiments, intermediate point recording devices 102 include timing and recording devices similar to those commonly found at the finish line of race events.

In the example embodiment shown in FIG. 2, track 100 is a one-mile oval track having seven intermediate points **104*a*-104*g*, one at each ⅛ mile along track 100 (not counting the finish line 108). Intermediate point recording devices 102 are located at each intermediate point 104*a*-104*g* and finish line recording devices 106 are located at the finish line 108. Different numbers of intermediate points 104*a*-104*g* may be used for races of various lengths. For example, for a ¾ mile race that begins at intermediate point 104*b*, the race may include five intermediate points 104 (104*c*-104*g*) and the finish line 108. For a one-mile race, the race may include all seven intermediate points 104*a*-104*g* and the finish line 108. In races that are longer than one mile (i.e., one full lap around track 100), the finish line 108 may act as an intermediate point 104 as well as the finish line 108. For example, for a ½ mile race that begins at intermediate point 104*d*, the race may include intermediate points 104*e*-104*g* and finish line 108 acting as an intermediate point 104, and then a full lap including intermediate points 104*a*-104*g* and the finish line 108 acting as the finish line of the race. Although particular shapes and lengths are used to provide details regarding an example track 100, it should be understood that in other embodiments, track 100 may have any shape and length, and may include any number of intermediate points 104** arranged in any configuration and at any distance from each other. In this regard, intermediate points may or may not be equidistant from each other.

Interval Bets 30

As discussed above, system 10 permits customers 20 to place interval bets 30 on race events having a plurality of race participants, such as horse races, dog races, or auto races, for example. Each interval bet 30 may include one or more bet components 32, each comprising a bet regarding the positions and/or fractional times of one or more particular race participants at one or more intermediate points 104 and/or at the finish line 108 of the race event.

As discussed above, each bet component 32 of an interval bet 30 may be defined by one or more various bet parameters

84, such as one or more particular race participants, one or more particular intermediate points 104, and one or more possible positions and/or fractional times of race participants at such intermediate points 104 and/or at the finish line 108, for example. Further, the result of each bet component 32 of an interval bet 30 may be determined based on whether one or more particular race participants determined for the interval bet 30 are positioned in one or more possible positions determined for one or more particular intermediate points 104 and/or at the finish line 108.

For some interval bets 30, each bet component 32 corresponds with one of the plurality of intermediate points 104, and the result of each bet component 32 is determined based on whether one or more particular race participants determined for the interval bet 30 are positioned in one or more possible positions determined for the intermediate points 104 corresponding to that bet component 32. For example, a first bet component 32 of an interval bet 30 may comprise a bet on whether three particular horses—Horses #2, #7 and #5—are positioned in order in three randomly-determined possible positions—Positions #3, #8 and #1 (i.e., 3rd place, 8th place, and 1st place)—at a first intermediate point 104*a* of a horse race. A second bet component 32 of the same interval bet 30 may comprise a bet on whether the same three particular horses—Horses #2, #7 and #5—are positioned in order in three other randomly-determined particular possible positions—Positions #4, #3 and #7 (i.e., 4th place, 3rd place, and 7th place)—at a second intermediate point 104*b* of the same horse race. Additional bet components 32 of the same interval bet 30 may be based on whether the same or different horses are positioned in any suitable number and combination of other randomly-determined possible positions at other intermediate points 104 or the finish line 108 of the same race.

Alternatively, or in addition, the result of each bet component 32 of an interval bet 30 may be determined based on whether one or more particular race participants determined for the interval bet 30 completes a portion of the race in a range of fractional times determined for one or more particular intermediate points 104 and at the finish line 108. The fractional timing wagers could be offered by the racetrack on a separate wagering card from traditional wagers on finishing positions. The fractional times would become the betting interests just as horses are the betting interests today. For each race, the racetrack's handicapper or morning line maker could reveal the "par" time for that level of race based on previous times for that condition and length (i.e. male, 3-year-old restricted claiming horses at the $50,000 level run an average time of 1:10 for 6 furlongs). Based on this par time, a field of fractional times would be set. Each field of fractional times would consist, for example, of thirty betting interests by using fractions within a four second spread (any suitable time spread, such as two or three second spreads, are contemplated). For example, if the par time was 1:10 for a particular length in a particular race, the thirty betting interests would range in fractional denominations from a time of 1:08 to a time of 1:12.

A sample race card could appear in this format:

Aqueduct, Race 1 is a $50,000 claiming race for 3-year-old horses. The par time for horses of this class is 1:10 for 6 furlongs. Therefore, the program for Race 1 would appear like the following:

#1. 1:08 and under—This would mean a bettor could bet number 1 and if the final time of the winning horse was 1:08 or under, the bettor would win.

#2. 1:08.01 to 1:08.20: This would mean a bettor could bet number 2 and if the final time of the winning horse was between 1:08.01 and 1:08.20, the bettor would win.

#3 1:08.21 to 1:08.40: This would mean a bettor could bet number 3 and if the final time of the winning horse was between 1:08.21 and 1:08.40, the bettor would win.

The betting options for the race above would continue until bet option #30 which would be 1:12.00 and over. Although the example above is detailed with respect to the times for a winning horse over the course of the entire race, the bet options could also be offered for any particular participant in the race over any suitable length of the race. For example, wagering can be offered for fractional times at various intermediate points in the race (e.g., for the first ¼ mile, ½ mile. ¾ mile, mile, etc.). In a further example, a par time and associated bet options could be offered by the track for the "lead" horse after 1 furlong of a 6 furlong race. Any suitable number and combination of participants, lengths, and times could be used to generate a series of betting options for a particular race.

Win betting, such as described above, would be available as well as daily double, pick (n), choose (n) and group betting. Additionally, exacta wagering (and any other forms of exotic wagering) could be made available by combining one or more wagers on fractional times with other wagers on fractional times, other wagers on positions of participants at intermediate points in a race, or with other bets, such as bets on finishing positions of participants in a race. For example, if a bettor likes #2 Smarty Jones to win the race and thinks that the final time is going to be 1:07.99 (betting option #1 above), then the bettor could make an exacta bet combining the win bet on Smarty Jones and the fractional time bet offered as option #1 above. Payouts for these types of bets would be based on a separate pool, such as a separate exacta pool that is not included in the traditional exacta pool.

The wagering on fractional times can be offered pari-mutuel, exchange based or available for fixed odds betting. With respect to a pari-mutuel format, a separate pool can be created for different types of betting options. For example, a particular pool can be created for wagering on fractional times of a winning participant in a particular race; a separate pool can be created for wagering on fractional times of the lead participant at the half-way point of the race; and yet another separate pool can be created for wagering on fractional times of any other participant at any other intermediate point in the race. Alternatively, a combined pool can be created to account for any number and combination of the above betting options.

In an exchange based environment, a first bettor can establish a wager with a second bettor on a particular event associated with fractional times. For example, a first bettor may bet that a particular horse will finish the race within a particular first range of fractional times while a second bettor may bet that the particular horse will either not finish in the first range of fractional times (counter to the first bettor's bet) or may bet that the particular horse will finish in a second range of fractional times (alternative to the first bettor's bet). The first and second bettors would establish a bet amount for the bet and the racetrack would receive a commission for facilitating the bet between the bettors.

In a fixed odds betting environment, the handicapper for the racetrack (or bookmaker or other applicable person or entity) would establish fixed odds for particular events associated with fractional times. The bettor would then place a bet for a bet amount at the established odds. For example, the odds for a particular horse to finish a 6 furlong race in a time between 1:08 and 1:10 may be set by the handicapper of the racetrack. The bettor would then be able to place the bet at the established odds for a bet amount.

The particular race participants determined for an interval bet 30 may be determined in any suitable manner. For example, one or more of the particular race participants may be selected by the customer 20 placing the interval bet 30. As another example, one or more of the particular race participants may be randomly selected by betting system platform 16. As another example, one or more of the particular race participants may be selected by betting system platform 16 based on race results regarding one or more previous race events. For instance, betting system platform 16 may select the particular race participants for an interval bet 30 based on (1) the finishing positions (or positions at some intermediate point) of race participants in a particular previous race and the numbers worn by such race participants, (2) results from one or more previous races regarding particular jockeys riding in the current race event, or (3) the finish positions (or positions at some intermediate point) in one or more previous races of one or more of the race participants participating in the current race. In a particular embodiment, betting system platform 16 may select as the particular race participants for an interval bet 30 the participants wearing the numbers of the one or more top-finishing participants in a particular previous race.

As yet another example, in embodiments in which interval bets 30 (or particular bet components 32) are pari-mutuel bets, one or more of the particular race participants for an interval bet 30 may be selected by betting system platform 16 based on (a) the participants selected for other customer's interval bets 30 on the same race event and/or (b) the wager amounts of such other interval bets 30. In some embodiments, betting system platform 16 may select the particular race participants for an interval bet 30 based on one or both of such inputs in order to increase or maximize (at least at the time that the particular race participants are selected for the interval bet 30) the potential payout(s) 80 for the customer 20 placing the interval bet 30 if the interval bet 30 (or particular bet components 32 of the interval bet 30) are winning bets. For example, for a particular interval bet 30 being generated for a particular race event, betting system platform 16 may determine for each race participant in the particular race event, the total wager amount of all other interval bets 30 for which that race participant was selected. Betting system platform 16 may then select the one or more race participants having the least associated total wager amount as the particular race participants for the particular interval bet 30. Thus, the potential payout(s) for the particular interval bet 30 may be increased or maximized (at least at the time that the particular race participants are selected for the particular interval bet 30) for the customer 20 placing the particular interval bet 30. An interval bet 30 in which the particular race participants are selected in such a manner may be referred to as a "value bet," since such bet may provide increased or maximum value to the customer 20. In an alternative embodiment, the same particular race participants are determined for each interval bet 30 associated with a particular race event. In such an embodiment, the possible positions and/or fractional times of race participants determined for each intermediate point 104 and/or finish line 108 may be different for different interval bets 30. Thus, multiple customers 20 placing interval bets 30 on the race event are assigned the same race participants, but different possible positions and/or fractional times at each intermediate point 104 and/or finish line 108, such that the results of the multiple interval bets 30 are (or may be) different.

Like the particular race participants determined for an interval bet 30, the particular possible positions and/or fractional times determined for each intermediate point 104 and/or the finish line 108 of a race event may be determined in any suitable manner. For example, one or more of the particular race positions and/or fractional times associated with participants may be selected by the customer 20 placing the interval bet 30. As another example, one or more of the positions and/or fractional times associated with particular race participants may be randomly selected by betting system platform 16. As another example, one or more of the positions and/or fractional times associated with particular race participants may be otherwise determined by betting system platform 16 or otherwise determined by a bet-providing entity, such as a race track, OTB entity, or tote entity, for example.

An interval bet 30 may include one or more single-point bet components 32 and/or one or more multi-point bet components 32. A single-point bet component 32 corresponds with a single intermediate point 104 in a race event. Thus, a single-point bet component 32 corresponding with a particular intermediate point 104 in a race may comprise a bet on whether one or more particular race participants are positioned in one or more particular possible positions determined for the particular intermediate point 104 or at finish line 108, and/or a bet on whether one or more particular race participants have a range of fractional times at a particular intermediate point 104 or at finish line 108. Various parameters of each single-point bet component 32 may define how to determine whether that single-point bet component 32 is a winning bet, such as, for bets on positions, (a) the number of particular race participants that must be actually positioned in the particular possible positions, and (b) whether such particular race participants must finish in such particular possible positions in a particular order; and, for bets on timing, (c) the number and identity of the race participants that must finish a portion of the race within one or more ranges of fractional times, and (d) the selection of such ranges of fractional times. In certain embodiments, various interval bets 30 may include a single bet component 32 covering an individual intermediate point 104, multiple bet components 32 each covering a particular intermediate point 104, a single bet component 32 covering multiple intermediate points 104, multiple bet components 32 each covering multiple intermediate points 104, or any other number of bet components 32 each covering any number and combination of intermediate points 104. Although the following description of single bet component 32 and multiple bet components 32 are described with reference to bets on positions of participants in a race, these bet components 32 could also be made with respect to the fractional times of participants at various points in the race, or upon any combination of position or fractional times for participants.

As an example, with reference to FIG. 2, a single-point bet component 32 corresponding with intermediate point 104*c* may comprise a bet on whether three particular race participants are positioned in three particular possible positions determined for intermediate point 104*c*. In order for the example single-point bet component 32 to be a winning bet, the three particular race participants must be actually positioned in the three particular possible positions, in a particular order. The one or more particular race participants and the one or more particular possible positions may be determined in various manners. For instance, as discussed below in greater detail, one or more of such particular race participants and/or particular possible positions may be selected by a customer or randomly determined by betting system platform 16.

In contrast, a multi-point bet component 32 corresponds with multiple intermediate points 104 and/or the finish line 108 of a race event. Thus, a multi-point bet component 32 corresponding with a group of intermediate points 104 and/or the finish line 108 of a race may comprise a bet on whether one or more particular race participants are positioned in one or more particular possible positions determined for the particular intermediate points 104 and/or the finish line 108. Various parameters of each multi-point bet component 32 may define how to determine whether that multi-point bet component 32 is a winning bet, such as (a) the number of particular race participants that must be actually positioned in the particular possible positions determined for each of the particular intermediate points 104 and/or the finish line 108, (b) whether such particular race participants must finish in such particular possible positions in a particular order, and (c) the number and identity of particular intermediate points 104 (and/or the finish line 108) for which such particular race participants must be positioned in the correct possible positions.

As an example, with reference to FIG. 2, a multi-point bet component 32 corresponding with intermediate points 104*b*, 104*d*, 104*f* and finish line 108 may comprise a bet on whether three particular race participants are positioned in three particular possible positions determined for intermediate points 104*b*, 104*d*, 104*f* and finish line 108. In this example, in order for the multi-point bet component 32 to be a winning bet, at each of intermediate points 104*b*, 104*d*, 104*f* and finish line 108, at least one of the three particular race participants must be positioned in one of the three particular possible positions determined for that intermediate point 104 or finish line 108. As discussed above, the one or more particular race participants and the one or more particular possible positions may be determined in various manners, such as being selected by a customer or randomly determined by betting system platform 16.

Two-Dimensional Bet Matrix 150

Figure 3:
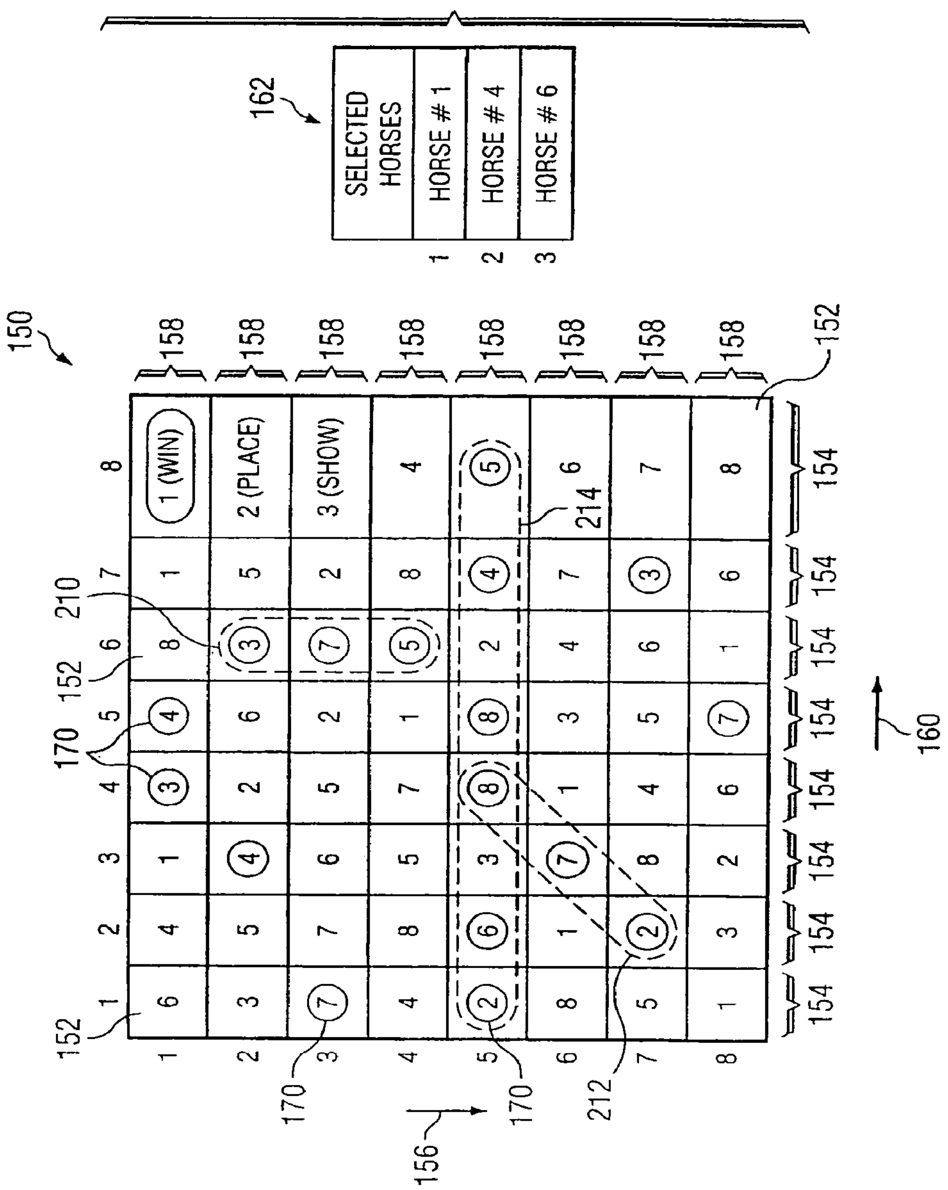
FIG. 3 illustrates an example two-dimensional bet matrix that at least partially defines one or more bet components of an interval bet in accordance with an embodiment of the present invention.

In some embodiments, betting system platform 16 generates a bet matrix 150 which at least partially defines the one or more bet components 32 of an interval bet 30. FIG. 3 illustrates an example two-dimensional bet matrix 150 that comprises a number of entries 152 arranged in a plurality of columns 154 extending in a first direction 156 and a plurality of rows 158 extending in a second direction 160.

Bet matrix 150 may include one column 154 corresponding with each intermediate point 104 and one column 154 corresponding with the finish line 108 of a particular race event. In the example bet matrix 150 shown in FIG. 3, each of columns #1-#7 corresponds with one of seven intermediate points 104*a*-104*g* of a race event, respectively, and column #8 corresponds with the finish line 108 of the race event. For each column 154, the entries 152 in that column 154 are numbers representing possible positions of race participants at the intermediate point 104 (or finish line 108) corresponding with that column 154. In some embodiments, some or all of the numbers (representing possible positions) in each column 154 are determined randomly by betting system platform 16. The remaining numbers in each column 54 (if any) may be determined by a customer 20. Although bet matrix 150 is described with respect to positions of participants in a race, these entries 152 for bet matrix 150 could also be ranges of fractional times of participants in the race, or any combination of positions or fractional times for participants in the race.

Bet matrix 150 may include any number of rows 158 depending on the type of the interval bet 30 associated with the bet matrix 150. For some interval bets 30, bet matrix 150 includes the number of rows 158 equal to the number of possible positions at each intermediate point 104 or the finish line 108, which equals the number of race participants in the race event. For instance, for an interval bet 30 regarding a horse race having nine participating horses, the bet matrix 150 for the interval bet 30 may include nine rows 158 such that each column 154 may include numbers representing each of the nine possible positions of each horse in the race. For other interval bets 30, bet matrix 150 includes less rows 158 than the number of possible positions (or race participants) in the race event. For instance, for an interval bet 30 regarding a horse race having twelve participating horses, the bet matrix 150 for the interval bet 30 may include only three rows 158 such that each column 154 may include three numbers representing only three of the twelve possible positions of each horse at that intermediate point 104 or finish line 108. The dimensions of bet matrix 150 may also be determined according to the range of fractional times that may form a bet on the race.

The example bet matrix 150 shown in FIG. 3 includes eight rows 158, namely rows #1-#8. The entries 152 in each column #1-#8 are numbers representing the first eight possible positions of race participants at the intermediate point 104 (or finish line 108) corresponding with that column 154. In this example, the entries 152 in columns #1-#7 are randomly determined possible positions, and the entries 152 in column #8 (corresponding with the finish line 108) are the first eight possible positions in order from 1 to 8. In other embodiments, the entries 152 in any of columns #1-#8 may be otherwise determined. For example, the entries 152 in all of the columns 154 in bet matrix 150 (including a column 154 corresponding to the finish line 108) may be randomly determined. In another example, the entries 152 in all columns 154 in bet matrix 150 may be determined by the customer 20. In still other embodiments, a portion of the entries 152 are randomly determined by platform 16 while the others are determined by the customer 20.

An indication of the one or more particular race participants determined for an interval bet 30, indicated as particular race participants 162, may be associated with bet matrix 150. Particular race participants 162 for interval bet 30 may be determined from the group of race participants in the race event in any suitable manner, such as being selected by the customer 20 placing the interval bet 30 or randomly determined by betting system platform 16, for example. In the example embodiment shown in FIG. 3, the particular race participants 162 determined for an interval bet 30 are three horses—Horses #1, #4 and #6—selected from ten horses (Horse #1-Horse #10) in a particular horse race.

As discussed above, bet components 32 may comprise bets on whether one or more particular race participants are positioned in one or more particular possible positions determined for one or more particular intermediate points 104 or finish line 108. Bet matrix 150 may define various types of bet components 32 for an interval bet 30 based on the occurrence and/or location of "matched" entries 170 within bet matrix 150. A matched entry 170 is an entry 152 in which one of the determined particular participants 162 is positioned in the possible position indicated by that entry 152. For example, if a particular entry 152 in a particular column 154 contains the number "3" (indicating 3rd place), the entry 152 is a matched entry 170 if one of the particular participants 162 is positioned in 3rd place at the intermediate point 104 (or finish line 108) corresponding with the particular column 154.

For some interval bets 30 or bet components 32, an entry 152 is a matched entry 170 if any of the particular participants 162 is positioned in the possible position indicated by that entry 152. For example, in the example shown in FIG. 3, entry 152 located at column #1, row #1 (i.e., number "6") is a matched entry 170 if any of Horses #1, #4 and #6 is positioned in 6th place at the first intermediate point 104*a* in the race. As another example, entry 152 located at column #3, row #4 (i.e., number "5") is a matched entry 170 if any of Horses #1, #4 and #6 is positioned in 5th place at the third intermediate point 104*c* in the race.

For other interval bets 30 or bet components 32, an entry 152 is a matched entry 170 only if a particular one of the particular participants 162 is positioned in the possible position indicated by that entry 152. For example, for some interval bets 30 or bet components 32, the particular participants 162 must be positioned in a particular order in the possible positions indicated by one or more entries 152. For instance, an example bet component 32 based on the bet matrix 150 shown in FIG. 3 is a winning bet only if the three particular participants 162—Horses #1, #4 and #6—are positioned in order in the three possible positions indicated by the first three entries 152 (i.e., the entries in rows #1-#3) in a column 154. Thus, regarding column #1 of bet matrix 150, (a) Horse #1 must be positioned in 6th place, (b) Horse #4 must be positioned in 3rd place, and (c) Horse #6 must be positioned in 7th place at the first intermediate point 104*a*.

As discussed above, bet matrix 150 may define various types of bet components 32 based on the occurrence and/or location of "matched" entries 170 within bet matrix 150. For example, some bet components 32 are winning bets if a particular number of matched entries 170 are aligned consecutively in direction 156 within a particular column 154. As another example, some bet components 32 are winning bets if a particular number of matched entries 170 are aligned consecutively in direction 160 within a particular row 158. As another example, some bet components 32 are winning bets if a particular number of matched entries 170 are aligned consecutively in a diagonal direction within bet matrix 150. As yet another example, some bet components 32 are winning bets if a particular number of matched entries 170 are aligned consecutively in any direction—vertically, horizontally or diagonally—within bet matrix 150.

The number of matched entries 170 that must be consecutively aligned for such bet components 32 may be any suitable number that is predetermined, randomly determined, determined by a customer 20, or otherwise determined. For some bet components 32, the number of matched entries 170 that must be consecutively aligned is equal to the number of determined race participants 162. Thus, in the example shown in FIG. 3, three matched entries 170 must be consecutively aligned for some bet components 32 to be winning bets. In other examples, the number of matched entries 170 that must be consecutively aligned could be randomly determined by platform 16 when the interval bet 30 is placed. In still other examples, a customer 20 may have the option of choosing the number of matched entries 170 that must be consecutively aligned. The payments 80 for a particular interval bet 30 (or bet component 32) may increase or decrease based on the number of matched entries 170 that must be consecutively aligned. In this regard, an interval bet 30 (or bet component 32) that requires three consecutively aligned matched entries 170 may pay out more than a bet 30 (or bet component 32) that requires two consecutively aligned matched entries 170 but less than a bet 30 (or bet component 32) that requires four consecutively aligned matched entries 170.

As yet another example, some bet components 32 are winning bets if a particular number of matched entries 170 are located in a particular row 158 and need not be aligned consecutively. The number of matched entries 170 required in the same row 158 may be any suitable number that is predetermined, randomly determined, determined by a customer 20, or otherwise determined. As with the number of consecutively aligned matched entries 170 described above, the payouts 80 for a bet component 32 may be based at least in part on the number of matched entries 170 in the same row 158 required to win. For example, in the example shown in FIG. 3, a bet component 32 may be a winning bet if at least five matched entries 170 are located in the same row 158 within bet matrix 150. As yet another example, some bet components 32 are winning bets if a particular number of matched entries 170 are located in a particular column 154 and need not be aligned consecutively. For example, in a bet matrix 150 that includes only three rows 158, a bet component 32 may be a winning bet if at least two matched entries 170 are located in the same column 154 within bet matrix 150. The payouts 80 for a bet component 32 that can win based on matched entries 170 in the same row 158 or column 154 may be less than those for bet components 32 requiring that same number of consecutively aligned matched entries 70.

As yet another example, some bet components 32 are winning bets if a particular number of matched entries 170 are located in the four corners of bet matrix 150. For example, a bet component 32 may be a winning bet if at least three matched entries 170 are located in the four corners of bet matrix 150. As yet another example, some bet components 32 are winning bets only if all of the entries 152 in the bet matrix 150 are matched entries 170. For example, in a bet matrix 150 that includes only one, two or three rows 158, a bet component 32 may be a winning bet only if all of the entries 152 in all of such rows 158 are matched entries 170.

It should be understood that other types of bet components 32 may be otherwise defined based on the occurrence and/or location of any number and combination of matched entries 70 within a bet matrix 150. It should be understood that an interval bet 30 may include any number of bet components 32, including any number of various different types of bet components 32. For example, the bet components 32 associated with bet matrix 150 may be based upon ranges of fractional times associated with participants completing portions of the race, or upon a combination of positions and fractional times for participants in the race.

Managing Various Types of Bet Components 32 Using a Bet Matrix 150

To illustrate some example types of bet components 32, suppose an interval bet 30 including four bet components 32 including:

(a) a first bet component 32*a* that is a winning bet if three or more instances of three matched entries 170 aligned in consecutive order either vertically, horizontally or diagonally are located within bet matrix 150;

(b) a second bet component 32*b* that is a winning bet if any row 158 includes at least six matched entries 170;

(c) a third bet component 32*c* that is a winning bet if all eight of the entries 152 in row #1 of bet matrix 150 are matched entries 170; and (d) a fourth bet component 32*d* that is a winning bet if the first three entries 152 in column #8 (i.e., the "win," "place" and "show" positions) of bet matrix 150 are matched entries 170.

FIG. 4 illustrates a table 200 indicating the actual positions 202 of each of the particular race participants 162—Horses #1, #4 and #6—at each intermediate point 104*a*-104*g* and at the finish line 108 of the race. In addition, the columns 154 of bet matrix 150 corresponding to each intermediate point 104*a*-104*g* and the finish line 108 are indicated below table 200 in FIG. 4.

Such actual positions 202 may be received by betting system platform 16 from recording devices 102 and 106 (discussed above) as race results 86. The actual positions 202 in table 200 may be used to identify matched entries 170 in bet matrix 150. For example, as shown in table 200, Horse #1 is positioned in 2nd place at intermediate point 104*a*. Thus, the entry 152 at column #1, row #5 of bet matrix 150 (see FIG. 3) is a matched entry 170 since that entry 152 is a "2," which indicates 2nd place. Further, Horse #4 is positioned in 7th place at intermediate point 104*a*. Thus, the entry 152 at column #1, row #3 of bet matrix 150 is a matched entry 170 since that entry 152 is a "7," which indicates 7th place. Further, Horse #6 is positioned in 12th place at intermediate point 104*a*. Since the entries 152 in bet matrix 150 include only numbers 1-8, there are no matched entries in column #1 corresponding to the 12th place position of Horse #6. This process may similarly be used to determine the matched entries 170 (if any) in rows #2-#8 of bet matrix 150. Each matched entry 170 in bet matrix 150 is indicated for illustrative purposes by a circle around that entry 152.

Once the matched entries 170 have been identified in bet matrix 150, results for each of the four bet components 32*a*-32*d* of the example interval bet 30 may be determined as follows:

Regarding the first bet component 32*a*, two instances of three matched entries 170 aligned in consecutive order are identified, including a first instance of three matched entries 170 aligned vertically in column #6, as indicated by dashed line 210, and a second instance of three matched entries 170 aligned diagonally and extending from column #2, row #7 to column #4, row #5, as indicated by dashed line 212. Thus, since first bet component 32*a* required three or more of such instances, first bet component 32*a* may be considered a losing bet.

Regarding the second bet component 32*b*, six matched entries 170 are located in row #5, as indicated by dashed line 214. Thus, since second bet component 32*b* required six or more matched entries 170 in a single row 158, second bet component 32*b* may be considered a winning bet.

Regarding the third bet component 32*c*, only three of the eight entries 152 in row #1 are matched entries 170. Thus, since third bet component 32*c* required all eight entries 152 in row #1 be matched entries 170, third bet component 32*c* may be considered a losing bet.

Regarding the fourth bet component 32*d*, only one of the first three entries 152 in column #8 (i.e., the "win," "place" and "show" positions) are matched entries 170. Thus, since fourth bet component 32*d* required all of the first three entries 152 in column #8 be matched entries 170, fourth bet component 32*d* may be considered a losing bet.

Thus, second bet component 32*b* may be considered a winning bet, while first, third and fourth bet components 32*a*, 32*c* and 32*d* may be considered losing bets. A payout 80 for second bet component 32*b* may be determined based on pari-mutuel rules or based on predetermined odds, depending on the particular embodiment.

Three-Dimensional Bet Matrix

Figure 5:
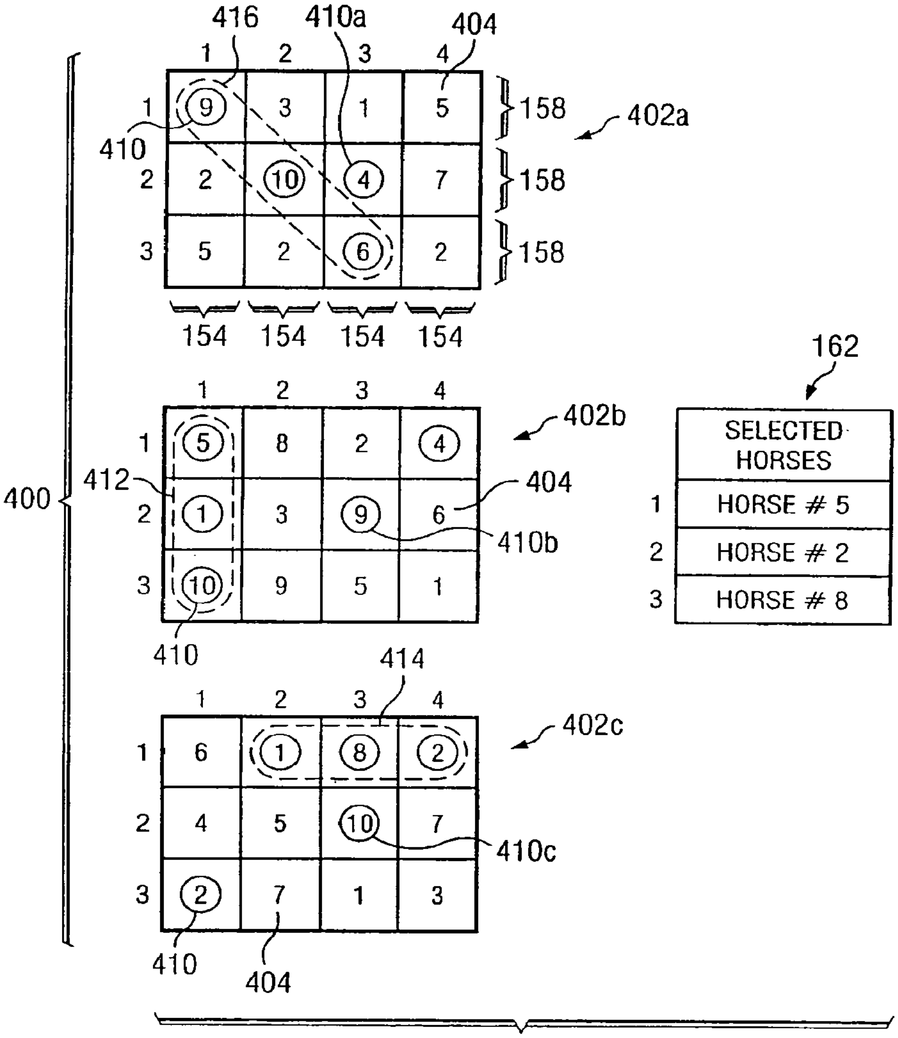
FIG. 5 illustrates an example three-dimensional bet matrix that at least partially defines one or more bet components of an interval bet in accordance with an embodiment of the present invention.

As discussed above, bet matrix 150 is a two-dimensional bet matrix of entries 152 used to define various bet components 32 of an interval bet 30. However, for some interval bets 30, a three-dimensional bet matrix may be used to define various bet components 32 of an interval bet 30. FIG. 5 illustrates an example three-dimensional bet matrix 400 that comprises a number of two dimensional bet matrices 402. Each two-dimensional bet matrix 402 may be similar to two-dimensional bet matrix 150 discussed above with reference to FIG. 3 and FIG. 4. Each two-dimensional bet matrix 402 within a three-dimensional bet matrix 400 may correspond to one of a group of race events, such as a group of races at a particular track in a single day or night, for example. Thus, in the embodiment shown in FIG. 5, three-dimensional bet matrix 400 includes three two-dimensional bet matrices 402*a*, 402*b* and 402*c*, each corresponding to one of three races scheduled to be run at a particular track on a particular night. Although bet matrix 150 is described with respect to positions of participants in a race, these entries 152 for bet matrix 150 could also be ranges of fractional times of participants in the race, or any combination of positions on fractional times for participants in the race.

Each two-dimensional bet matrix 402*a*, 402*b* and 402*c* includes a number of entries 404 representing possible positions of race participants at an intermediate point 104 and/or the finish line 108 of the race corresponding to that two-dimensional bet matrix 402*a*, 402*b* or 402*c*. As discussed above regarding bet matrix 150, each column 154 in each bet matrix 402 may correspond with an intermediate point 104 or the finish line 108 of the race corresponding to that bet matrix 402. In the embodiment shown in FIG. 6, for each bet matrix 402, columns #1-#3 correspond with an intermediate point 104 in the race corresponding to that bet matrix 402 and column #4 corresponds with the finish line 108 of that race.

Entries 404 that are "matched" are indicated as circled entries 404 in FIG. 5, and denoted as matched entries 410. As discussed above regarding bet matrix 150, each matched entry 410 is an entry 404 in which one of the particular race participants (for example, the three selected horses 162 shown in FIG. 6) is positioned in the possible position indicated by that entry 404 at the intermediate point 104 or finish line 108 corresponding with the column 154 in which that entry 404 is located.

Figure 6:
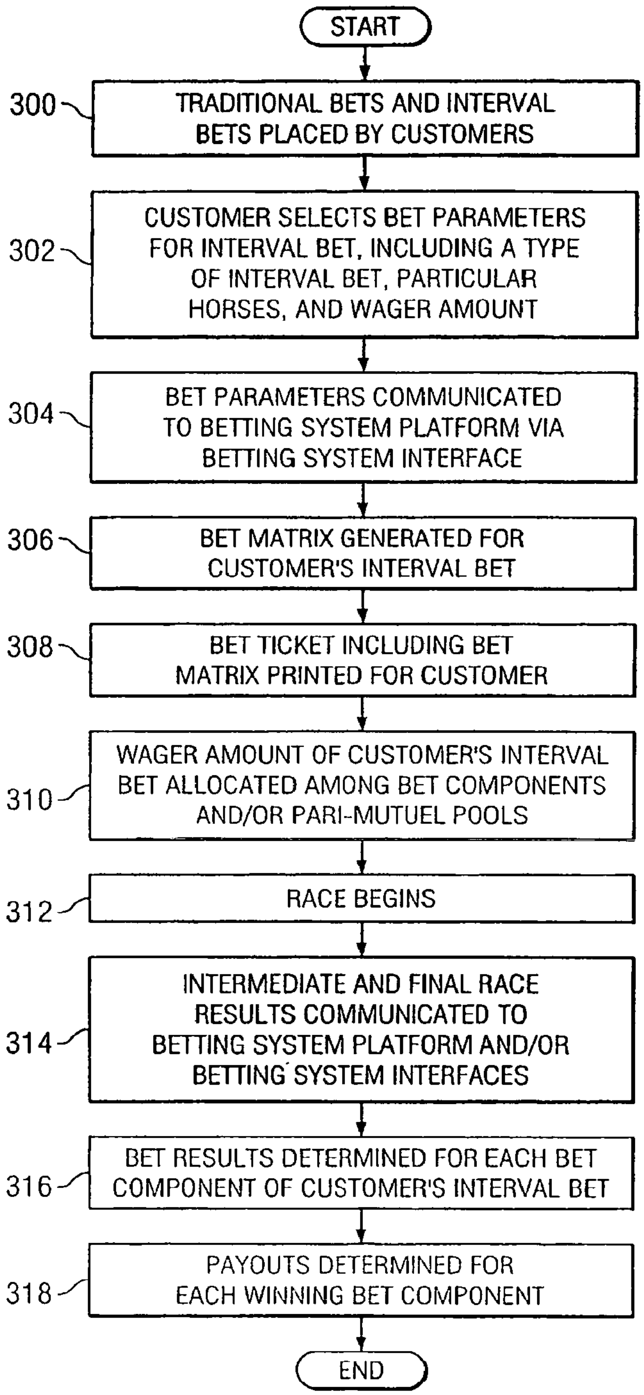
FIG. 6 is a flowchart illustrating an example method of receiving and managing interval bets in accordance with an embodiment of the present invention.

Like two-dimensional bet matrix 150, three-dimensional bet matrix 400 may at least partially define one or more various types of bet components 32 for an interval bet 30. For example, as discussed above regarding bet matrix 150, certain bet components 32 may regard whether a particular number of matched entries 404 are aligned consecutively in a particular direction, such as vertically within a single column 154, horizontally within a single row 158, or diagonally across multiple columns 154 and rows 158. Supposing that example bet components 32 require three or more matched entries 404 aligned consecutively either vertically, horizontally, or diagonally, example winning bets are shown in FIG. 6 by the groups of matched entries 404 indicated by dashed lines 412 (vertical), 414 (horizontal) and 416 (diagonal).

In addition, certain bet components 32 may regard whether a particular number of matched entries 404 are aligned consecutively in a direction perpendicular to the two-dimensional matrices 402. In other words, a particular bet component 32 may require a particular number of matched entries 404 in the same column 154 and row 158 across more than one of the two-dimensional matrices 402. For example, in the embodiment shown in FIG. 6, a particular bet component 32 may require matched entries 404 in the same column 154 and row 158 of each of the three two-dimensional matrices 402*a*, 402*b* and 402*c*. An example winning bet of this type of bet component 32 is shown in FIG. 5 at column #3, row #2 of each matrix 402*a*, 402*b* and 402*c*, as indicated by the group of three matched entries 410*a*, 410*b* and 410*c*.

It should be understood that other types of bet components 32 may be otherwise defined based on the occurrence and/or location of any number and combination of matched entries 404 within bet matrix 400, including groups of matched entries 404 in any direction (for example, horizontal, vertical, or diagonal) within a single two-dimensional matrix 402 or across multiple two-dimensional matrices 402.

Jackpot Bets

In some embodiments, some or all interval bets 30 and/or bet components 32 provided by betting system platform 16 may have a jackpot bet component 94, which may be implemented in various ways. Generally, a jackpot bet component 94 is a relatively (or very) low-odds wager having a relatively (or very) high payout. For instance, regarding a two-dimensional bet matrix 150, example jackpot bet components 94 may comprise bets such as: (1) a bet that all (or a particular minimum number) of the entries 152 in one or more particular rows 158, (b) a particular minimum number of rows 158, or (c) all of the rows 158, of a bet matrix 150 will be matched entries 170; (2) a bet that all (or a particular minimum number) of the entries 152 in (a) one or more particular columns 154, (b) a particular minimum number of columns 154, or (c) all of the columns 154, of a bet matrix 150 will be matched entries 170 (which bet may or may not require the particular race participants to be in a particular order in the possible positions indicated by the entries 152 in each of such particular columns 154); and (3) a bet that a particular minimum number of entries 152 in bet matrix 150 will be matched entries 170. A jackpot bet component 94 may be a particular bet component 32 of an interval bet 30 or may comprise a portion of an interval bet 30 or one or more particular bet components 32 of an interval bet 30.

In some embodiments, a fraction of the wager amount of an interval bet 30 placed by a customer 20 may be assigned to one or more jackpot bet components 94, either automatically or upon selection by the customer 20. For example, a customer 20 may have the option of having a particular percentage of the wager amount of his interval bet 30 allocated to one or more particular jackpot bet components 94. As another example, a particular percentage of the wager amounts of interval bets 30 received from customers 20 may be automatically allocated to one or more particular jackpot bet components 94. For instance, for a one-mile race event having seven intermediate points 104, betting system platform 16 may automatically allocate the wager amount for an interval bet 30 placed by a customer 20 into nine equal portions for nine bet components 32—one for each of the seven intermediate points 104, one for the finish line 108, and one jackpot bet component 94.

In some embodiments, a jackpot bet component 94 may be associated with a rolling pot (or "jackpot pool") that grows over time (e.g., over a number of race events, days, weeks, or years) until a customer 20 has a winning jackpot bet component 94 and wins the jackpot pool. Thus, if there are no winning bets on a particular jackpot bet component 94 for a particular race, the wager amounts allocated to such jackpot bet components 94 may be maintained in a jackpot pool and carried forward to one or more subsequent races. A separate jackpot pool may be maintained for each type of jackpot bet component 94 such that multiple jackpot pools may be maintained simultaneously. Alternatively, a single jackpot pool may be used for multiple (or all) types of jackpot bets 94 offered at a particular track or by betting system platform 16, for example.

In other embodiments, rather than having a rolling jackpot pool, a jackpot bet component 94 may be associated with a single race event. For example, a jackpot bet component 94 may comprise a bet regarding the (1) the number of rows 158 in a bet matrix 150 having a particular number of matched entries 170; (2) the number of columns 154 in a bet matrix 150 having a particular number of matched entries 170; or (3) the total number of matched entries 170 in a bet matrix 150. The interval bet(s) 30 having bet matrices with the greatest number of such rows 158, columns 154, or total matched entries 170 may be deemed as having a winning jackpot bet component 94 and payouts 80 may be awarded to the customer(s) 20 that placed such interval bet(s) 30.

Example Operation of System 10

FIG. 6 is a flowchart illustrating an example method of receiving and managing interval bets 30 in accordance with an embodiment of the present invention. At step 300, bets 12—including interval bets 30 and/or traditional bets 34—regarding a particular race event are received from customers 20 via one or more betting system interfaces 14, such as described above with reference to FIG. 1.

At steps 302-308, a particular customer 20*a* places an interval bet 30*a* regarding a particular horse race as follows. At step 302, customer 20*a* selects one or more bet parameters 84*a* for an interval bet 30*a*, including, for example, a type of interval bet 30*a*, one or more bet components 32*a* of the interval bet 30*a*, one or more particular horses from the group of horses scheduled to race in the particular horse race, and/or a wager amount for the interval bet 30*a* or for each bet component 32*a* of interval bet 30*a*. In other embodiments, the one or more particular horses for interval bet 30*a* may be otherwise determined, such as randomly determined by betting system platform 16, for example. In this example, suppose customer 20*a* selects two horses, for example Horse #3 and Horse #7. At step 304, customer 20*a* communicates the bet parameters 84*a*, as well as the wager amount, to a betting system interface 14, which communicates the bet parameters 84*a* to betting system platform 16. At step 306, betting system platform 16 generates a bet matrix 150*a* for customer 20*a*'s interval bet 30 based on the received bet parameters 84*a* and various event parameters 82 regarding the particular horse race, such as the length of the race and the number of horses scheduled to compete in the race, for example. In other embodiments, all or portions of bet matrix 150*a* may be generated by customer 20*a*. For example, customer 20*a* may select some or all of the entries 152 of bet matrix 150*a*. In any event, betting system platform 16 may store the generated bet matrix 150*a* in memory 72. At step 308, betting system platform 16 communicates the bet matrix 150*a* to an appropriate betting system interface 14, such as a teller 44 or self-service machine 48, for example, such that the betting system interface 14 may print a bet ticket 92 for customer 20*a* that includes some or all of the following: (a) a printed version of the bet matrix 150*a*, (b) the wager amount, (c) an indication of the track and particular race event, (d) the scheduled time for the particular race event, and (e) an indication of the two horses (Horse #3 and Horse #7) selected by customer 20*a*. Customer 20*a* may use bet ticket 92 to track the progress of his interval bet 30*a* and determine a result for each bet component 32*a* of interval bet 30*a*, such as discussed below at step 314.

At step 310, betting system platform 16 may allocate the wager amount of interval bet 30*a* among the various bet components 32*a* of interval bet 30*a*. Such allocation may be made (a) according to selections made by customer 20*a* when placing interval bet 30*a*, (b) based on predetermined wager allocation rules maintained by betting system platform 16, or (c) according to other criteria. In some embodiments, betting system platform 16 allocates an equal portion of the wager amount of interval bet 30*a* to each of the bet components 32*a* of interval bet 30*a*. For example, for an interval bet 30*a* having three bet components 32*a*, betting system platform 16 allocates a third of the wager amount to each of the three bet components 32*a*. As another example, for a race event having eight bet components (such as a one mile race having a bet component 32 corresponding to each ⅛ mile of the race, for example), 12.50¢ of each $1.00 wagered on an interval bet 30 may be allocated to each of the eight bet components 32. In some embodiments, betting system platform 16 may automatically allocate the wager amount of an interval bet 30*a* based on the length of the race event or the number of intermediate points 104 in the race event. For example, in a seven-furlong (⅞ mile) race event having intermediate points 104 at each furlong (i.e., each ⅛ mile), betting system platform 16 may automatically allocate the wager amount of an interval bet 30*a* on the race event into sevenths, wherein one-seventh is allocated to each of seven bet components 32 (one corresponding to each of six intermediate points 104 and one corresponding to the finish line 108). In other embodiments, betting system platform 16 and/or a betting system interface 14 may allow customer 20*a* to provide input regarding the allocation of the wager amount of interval bet 30*a* among the various bet components 32*a* of interval bet 30*a*. For example, supposing interval bet 30*a* includes three bet components 32*a*, customer 20*a* may request to allocate 50% of the wager amount to one of the bet components 32*a* and 25% to each of the other two bet components 32*a*. In embodiments in which interval bets 30 are pari-mutuel bets, the allocation of the wager amount to each of the bet components 32*a* of interval bet 30*a* may include allocating the wager amount into one or more pari-mutuel pools. For example, in an embodiment in which a separate pari-mutuel pool is provided for each type of bet component 32*a*, betting system platform 16 may allocate the wager amount into the various pari-mutuel pools according to any of the criteria discussed above.

At step 312, the particular race event begins. At step 314, race results 86 are communicated from the track, an OTB entity, or some other entity to betting system platform 16. Race results 86 may indicate at least the actual positions 202 and/or fractional times of each horse in the particular race at each intermediate point 104 and at the finish line 108 of the race. For example, race results 86 may include the type of data in table 200 shown in FIG. 4. In some embodiments, such race results 86 are also communicated to one or more betting system interfaces 14 such that customers 20 may track the progress of the race and/or their bets 12 on the race. In some embodiments, race results 86 are communicated to betting system platform 16 and/or betting system interfaces 14 in real time or substantially in real time.

At step 316, betting system platform 16 may determine a bet result 78 for each bet component 32*a* of interval bet 30*a* based on the received race results 86 regarding the race, bet parameters 84 regarding each bet component 32*a*, and bet matrix 150*a* generated at step 306. For example, betting system platform 16 may determine whether each bet component 32*a* is a "win," "loss," "push," or "no action" using one or more of the techniques discussed above.

At step 318, betting system platform 16 may determine a payout 80 for each bet component 32*a* determined to be a winning bet at step 316. In a pari-mutuel system, betting system platform 16 may determine a payout 80 for each bet component 32*a* according to known methods for determining pari-mutuel payouts. Betting system platform 16 may take out a commission, or "take out," from the wager amount of the interval bet 30*a* or from the portion of the wager amount allocated to each bet component 32*a*. For example, in some embodiments, such commission or "take out" may be a predetermined percentage (such as 10% for example) of the wager amount. In some instances, payouts 80 determined for customer 20*a* may be paid to customer 20*a* via one or more betting system interfaces 14. Alternatively, betting system platform 16 may update a wagering account for customer 20*a* based on the amounts of such payouts 80.

What is claimed is:

1. A method for betting comprising:

controlling, by at least one processor:

receiving at least one bet over a communication network from each of a plurality of computing devices, each of the at least one bets designating a participant in a race, a point in the race and a range of times, in which the race has a plurality of participants and a given bet pays if the designated participant arrives at a designated point within the range of times;

determining actual times for the participants designated by the bets at the designated points during running of the race, based on race positioning information obtained by a respective plurality of measuring devices and received in real time over the communication network from the plurality of measuring devices; and determining whether any of the bets is a winning bet based at least in part upon the actual times and the corresponding bets;

wherein at least one given bet of the bets comprises a plurality of bet components and at least one bet component is associated with a bet matrix, the matrix having a plurality of columns extending in a first direction and a plurality of rows extending in a second direction, each column of the bet matrix corresponding with an intermediate point in the race; and for at least one column of the plurality of columns in the bet matrix, populating the at least one column with numbers identifying one or more possible fractional times determined for the intermediate point corresponding with the at least one column such that at least one fractional time is located in each row intersecting the at least one column, in which a particular bet component is a winning bet component if the bet matrix includes a particular number of matched entries aligned consecutively in a particular direction in the bet matrix;

the bets being divided into a plurality of betting pools, wherein at least two of the betting pools are associated with respective intermediate points of the race;

the bets being received on a betting exchange; and displaying, over the communication network, at an interface of a display of at least one of the computing devices, at least one of the bet matrix or an outcome of the at least one bet.

2. An apparatus comprising:

at least one processor configured to control:

receiving, over a communication network, at least one bet from each of a plurality of computing devices, each of the at least one bets designating a participant in race, a point in the race, and a range of times, in which the race has a plurality of participants and a given bet pays if the designated participant arrives at a designated point within the range of times;

determining actual times for the participants designated by the bets at the designated points during running of the race, based on race positioning information obtained by a respective plurality of measuring devices and received in real time over the communication network from the plurality of measuring devices; and determining whether any of the bets is a winning bet based at least in part upon the actual times and the corresponding bets;

wherein at least one given bet of the bets comprises a plurality of bet components and at least one bet component is associated with a bet matrix, the matrix having a plurality of columns extending in a first direction and a plurality of rows extending in a second direction, each column of the bet matrix corresponding with an intermediate point in the race; and for at least one column of the plurality of columns in the bet matrix, populating the at least one column with numbers identifying one or more possible fractional times determined for the intermediate point corresponding with the at least one column such that at least one fractional time is located in each row intersecting the at least one column, a particular bet component is a winning bet component if the bet matrix includes a particular number of matched entries aligned consecutively in a particular direction in the bet matrix;

the bets being divided into a plurality of betting pools, wherein at least two of the betting pools are associated with respective intermediate points of the race;

the bets being received on a betting exchange; and displaying, over the communication network, at an interface of a display of at least one of the computing devices at least one of the bet matrix or an outcome of the at least one bet.

3. An apparatus comprising:

at least one processor configured to control:

receiving, over a communication network, a bet from a first computing device, in which the bet indicates a participant in a race, an intermediate point in the race, and a range of time;

determining whether the bet is a winning bet based at least in part on whether the participant reaches the intermediate point during the range of time using race positioning information obtained by a measuring device and received in real time over the communication network from the measuring device; and rendering, over the communication network, at an interface of a second computing device, an indication of whether the bet is a winning bet.

4. The apparatus of claim 3, in which the bet indicates at least one other participant in the race, at least one other intermediate point in the race, and another range of time; and in which determining whether the bet is a winning bet includes determining based at least in part on whether the at least one other participant reaches the at least one other intermediate point during the another range of time.

5. The apparatus of claim 3, in which the bet indicates a second range of time; and in which determining whether the bet is a winning bet is based at least in part on whether the participant finishes the race in the second range of time.

6. The apparatus of claim 3, in which the at least one processor is configured to control allocating a payment to a bettor that made the bet if the bet is a winning bet.

7. A method comprising:

controlling, by at least one processor, receiving, over a communication network, a bet from a first computing device, in which the bet indicates a participant in a race, an intermediate point in the race, and a range of time;

determining whether the bet is a winning bet based at least in part on whether the participant reaches the intermediate point during the range of time using race positioning information obtained by a measuring device and received in real time over the communication network from the measuring device; and rendering, over the communication network, at an interface of a second computing device an indication of whether the bet is a winning bet.

8. The method of claim 7, in which the bet indicates at least one other participant in the race, at least one other intermediate point in the race, and another range of time; and in which determining whether the bet is a winning bet includes determining based at least in part on whether the at least one other participant reaches the at least one other intermediate point during the range of time.

9. The method of claim 7, in which the bet indicates a second range of time; and in which determining whether the bet is a winning bet is based at least in part on whether the participant finishes the race in the second range of time.

10. The method of claim 7, further comprising controlling, by the at least one processor, allocating a payment to a bettor that made the bet if the bet is a winning bet.

* * * * *